(12) United States Patent
Humm

(10) Patent No.: US 10,875,126 B2
(45) Date of Patent: Dec. 29, 2020

(54) WELDED FENCING SYSTEM WITH PREFABRICATED CONNECTORS

(71) Applicant: Richard Humm, Queen Creek, AZ (US)

(72) Inventor: Richard Humm, Queen Creek, AZ (US)

( * ) Notice: Subject to any disclaimer, the term of this patent is extended or adjusted under 35 U.S.C. 154(b) by 0 days.

(21) Appl. No.: 16/132,253

(22) Filed: Sep. 18, 2018

(65) Prior Publication Data

US 2019/0195400 A1 Jun. 27, 2019

Related U.S. Application Data

(62) Division of application No. 14/197,398, filed on Mar. 5, 2014, now Pat. No. 10,094,496.

(Continued)

(51) Int. Cl.
*B23K 33/00* (2006.01)
*F16L 21/00* (2006.01)
(Continued)

(52) U.S. Cl.
CPC ............ *B23K 33/006* (2013.01); *B23K 31/02* (2013.01); *E04B 1/1909* (2013.01); *F16L 21/00* (2013.01); *B23K 2101/00* (2018.08); *B23K 2101/10* (2018.08); *B23K 2103/04* (2018.08); *Y10T 403/4602* (2015.01)

(58) Field of Classification Search
CPC .. F16B 7/00; F16B 7/04; F16B 7/0406; F16B 7/0413; F16B 7/044; F16B 7/0446; F16B 7/0486; E04F 11/1817; Y10T 403/42; Y10T 403/4621; Y10T 403/7001; Y10T 403/7003; Y10T 403/3933; Y10T 403/3941; Y10T 403/346; E04B 1/1909; F16L 13/02
USPC .......... 52/653.2, 655.1, 656.9; 285/181, 182, 285/197; 256/65.01, 65.03, 65.05; 403/170, 205
See application file for complete search history.

(56) References Cited

U.S. PATENT DOCUMENTS

| 616,073 A | * | 12/1898 | Brennan | ................... F16C 9/02 |
| | | | | 384/431 |
| 2,101,707 A | * | 12/1937 | Ewing | ................. E04F 11/1817 |
| | | | | 403/186 |

(Continued)

FOREIGN PATENT DOCUMENTS

JP 2006002522 A * 1/2006

*Primary Examiner* — Robert Canfield
(74) *Attorney, Agent, or Firm* — Paul B. Heynssens Attorney at Law, PC

(57) ABSTRACT

A corner fitting includes a sleeve body having a hollow inner space and configured to coaxially fit over a pipe member of a predetermined size. An edge of the sleeve body at a second distal end has a corner cut portion, a protruding tab, and two recesses, the protruding tab being diametrically opposed to the corner cut portion in the radial direction of the sleeve body, and the recesses being diametrically opposed to each other in the radial direction of the sleeve body. The corner cut portion is configured and shaped such that the sleeve body fits together with an identical sleeve body on the pipe member of the predetermined size with the corner cut portions of the two sleeve bodies contacting each other and with the pipe being nested between the protruding tabs of the second distal ends of the two sleeve bodies.

13 Claims, 18 Drawing Sheets

Related U.S. Application Data

(60) Provisional application No. 61/777,649, filed on Mar. 12, 2013.

(51) Int. Cl.
 E04B 1/19 (2006.01)
 B23K 31/02 (2006.01)
 B23K 101/00 (2006.01)
 B23K 101/10 (2006.01)
 B23K 103/04 (2006.01)

(56) References Cited

U.S. PATENT DOCUMENTS

| | | | | |
|---|---|---|---|---|
| 2,150,651 A * | 3/1939 | Ewing | ............... | E04F 11/1817 403/201 |
| 2,242,427 A * | 5/1941 | Heanue | ............... | E04F 11/1817 256/65.08 |
| 2,557,766 A * | 6/1951 | Ronfeldt | ............... | F16B 7/0446 403/237 |
| 3,062,567 A * | 11/1962 | De Witt | ............... | F16L 41/084 285/189 |
| 3,233,871 A * | 2/1966 | Schroer | ............... | E04F 11/1817 256/69 |
| 3,424,178 A * | 1/1969 | Yazaki | ............... | E04B 1/34326 135/157 |
| 3,724,222 A * | 4/1973 | Crain | ............... | E02B 3/24 405/227 |
| 4,286,372 A * | 9/1981 | Batcheller | ............... | B21D 39/04 256/65.09 |
| 4,783,188 A * | 11/1988 | Souza, Jr. | ............... | E04F 11/1817 403/190 |
| 4,864,795 A * | 9/1989 | Burg | ............... | F16B 7/04 52/646 |
| 5,249,818 A * | 10/1993 | Patterson | ............... | B23K 15/002 280/281.1 |
| 5,908,260 A * | 6/1999 | Watson | ............... | E04F 11/1817 403/205 |
| D742,209 S * | 11/2015 | Humm | ............... | D8/382 |
| 2004/0101354 A1* | 5/2004 | Nakahori | ............... | F16B 7/0426 403/169 |
| 2005/0224777 A1* | 10/2005 | Terrels | ............... | E04F 11/1817 256/65.01 |
| 2010/0092236 A1* | 4/2010 | Kang | ............... | E04B 1/585 403/170 |
| 2014/0270919 A1* | 9/2014 | Kokinakis | ............... | B23K 31/02 403/231 |
| 2017/0348803 A1* | 12/2017 | Priefert | ............... | B23K 33/006 |

* cited by examiner

WELDED FENCING SYSTEM WITH PREFABRICATED CONNECTORS

CROSS-REFERENCE TO RELATED APPLICATION

This application is a divisional application of U.S. patent application Ser. No. 14/197,398, filed Mar. 5, 2014, which claims befit of U.S. Provisional Patent Application No. 61/777,649 filed Mar. 12, 2013, the contents of which are hereby incorporated by reference.

TECHNICAL FIELD

The present invention relates generally to the field of building structures using pipe as a structural member, and in one particular embodiment relates to the use of reclaimed pipe such as drill pipe which has been used for oil extraction.

BACKGROUND

The conventional method of building with pipe requires the employment of an experienced welder. The welder employs a torch or plasma cutter, a chop saw, a grinder, a welding rod, oxygen and acetylene tanks, grinding wheels, a power source, and the like.

As an example, a welder may build a fence from reclaimed drill pipe. To do so the welder begins by cutting drill pipe from raw stock, using a demolition saw, to form posts and rails which match the structure specifications. Once the posts are cut, they are pounded into the ground along the fence line. Using an oxygen and acetylene cutting torch the welder cuts a saddle into each post top to hold the top rail. Next he will cut a piece of pipe to extend between adjacent posts, including cutting a saddle out of each end to fit the two posts. A jig may be used to mark and cut the pipe. A torch or plasma device is used to cut the saddle, and thus a rough edge is left and it is necessary to grind a smooth surface before welding. Each saddle is thusly formed by hand and there will be imperfections and variations in the shape of the saddles. In order to attempt to achieve a proper saddle fit, the welder might pound the rail into the post or use a welding rod to fill gaps and imperfections.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

However, the conventional method has many draw backs. Gaps or imperfections in the saddle can result in an unwanted moisture path in the finished joint. Gaps will also result in a weaker weld and a weaker finished structure. Lack of consistency between the saddles and the welds negatively affects the look, feel, and strength of the finished product. Also, significant grinding is necessary to remove sharp burs and the like, in order to ensure that livestock or people will not be harmed by contact with jagged weld points. The process of creating joints by hand is even more complicated when creating corner joints at angles such as 45 or 22.5 degrees. Such corner joints require the precise marrying of two hand-cut pieces, and may thus be even more prone to have gaps and imperfections.

Additionally, the conventional technique is a work-intensive endeavor that requires experienced and expensive labor.

Further still, new regulations and safety standards are being implemented with respect to plasma devices and torches, and in some states multiple parties are required in order to manage the hazards of a plasma device or torch.

The present invention eliminates the need for hand-crafting each joint of a structure by providing a universal auxiliary fitting component which is configured to be usable in several different types of joints, as discussed in more detail below. The invention described herein has a goal of eliminating the above-discussed problems and hazards. According to the features and aspects of the present invention, it is possible to reduce or eliminate the occurrence of gaps and imperfections in the joints between pipe members, reduce the amount of labor required to build a structure, reduce the experience and expertise needed to achieve a strong and durable structure, reduce the amount of grinding required, and reduce or eliminate the need for a plasma device or torch. The present invention reduces the need for precision cuts, and reduces the occurrence of imperfections to thereby yield a stronger finished structure of a higher overall quality. Additionally, because it is possible to reduce or eliminate gaps in the joints between pipes, the finished structure will last longer due to the elimination of unwanted moisture penetration.

Although the present invention is not limited to the use of reclaimed or used drill pipe, the invention is especially useful due to the fact that there are millions of feet of discarded drill pipe which can be used to build fences, storage sheds, dwelling structures, and the like by utilizing the present invention. Such recycling is particularly advantageous in view of the fact that oil drilling is often undertaken in remote regions where materials and resources are limited.

The above-described advantages of the present invention are achieved using a corner fitting having a sleeve body with a hollow inner space and configured to coaxially fit over a pipe member of a predetermined size. The sleeve body has a first distal end and a second distal end spaced apart from the first distal end in a longitudinal direction, and an edge of the sleeve body at the first distal end has two protruding tabs and two recesses. The two protruding tabs and the two recesses of the first distal end of the sleeve body are configured and arranged such that the first distal end of the sleeve body fits over the pipe member of the predetermined size with the sleeve body contacting an outer periphery of the pipe member at the protruding tabs and at the recesses in a state in which a longitudinal axis of the pipe member is perpendicular to a longitudinal axis of the sleeve body and the pipe member is nested in the recesses and between the two protruding tabs of the first distal end. An edge of the sleeve body at the second distal end has a corner cut portion, a protruding tab, and two recesses. The corner cut portion is configured and shaped such that the sleeve body fits together with an identical sleeve body on the pipe member of the predetermined size in an arrangement with the longitudinal axes of the two sleeve bodies being transverse with respect to each other with the corner cut portions of the two sleeve bodies contacting each other and with the pipe being nested between the protruding tabs of the second distal ends of the two sleeve bodies.

The two recesses, the protruding tab, and the corner cut portion of the second distal end of the sleeve body may be configured and arranged such that the second distal end of the sleeve body fits over the pipe member of the predetermined size with the sleeve body contacting an outer periphery of the pipe member at the recesses and the protruding tab in a state in which a longitudinal axis of the pipe member is perpendicular to a longitudinal axis of the sleeve body and the pipe member is nested in the recesses of the second distal end. The corner cut portion includes two knobs and an arcuate recess extending inwardly in the longitudinal direction of the sleeve body between the two knobs, with one of the two knobs being contiguous with one of the recesses at the second distal end of the sleeve body and the other of the two knobs being contiguous with the other of the recesses at the second distal end of the sleeve body. The arcuate recess of the corner cut portion is configured such that the sleeve body fits together with an identical sleeve body at a predetermined angle with the corner cut portions contacting each other over an entirety of each corner cut portion.

The above-described configuration of a corner fitting advantageously facilitates the creation of several different types of joints with the same fitting member, thereby eliminating the need for painstakingly shaping and grinding the ends of pipe members to fit together during construction of a structure.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
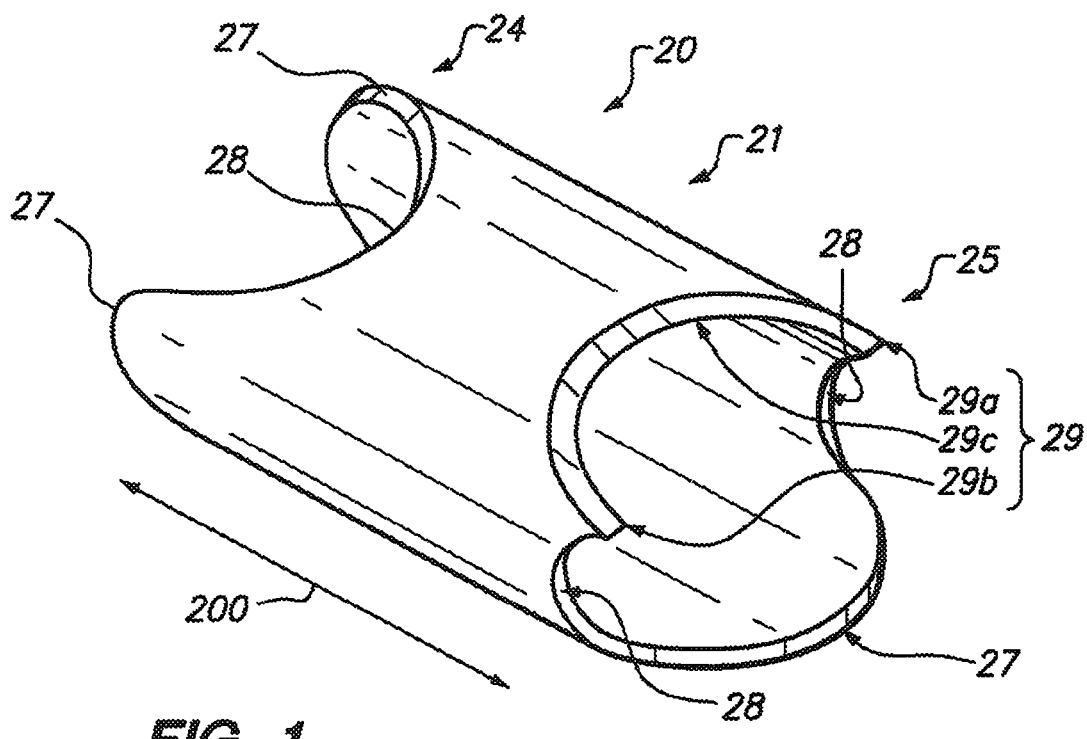
FIG. 1 shows a perspective view of a corner fitting in accordance with an embodiment of the present invention.
Figure 2:
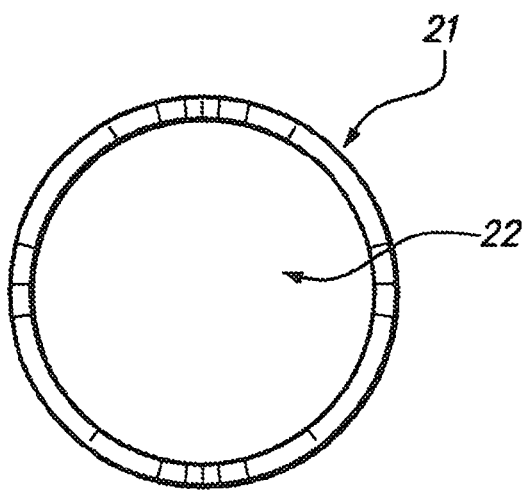
FIG. 2 shows a front view of the corner fitting of FIG. 1.
Figure 3:
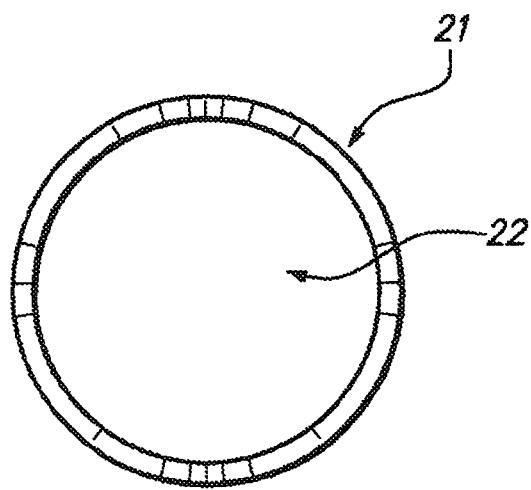
FIG. 3 shows a rear view of the corner fitting of FIG. 1.
Figure 4:
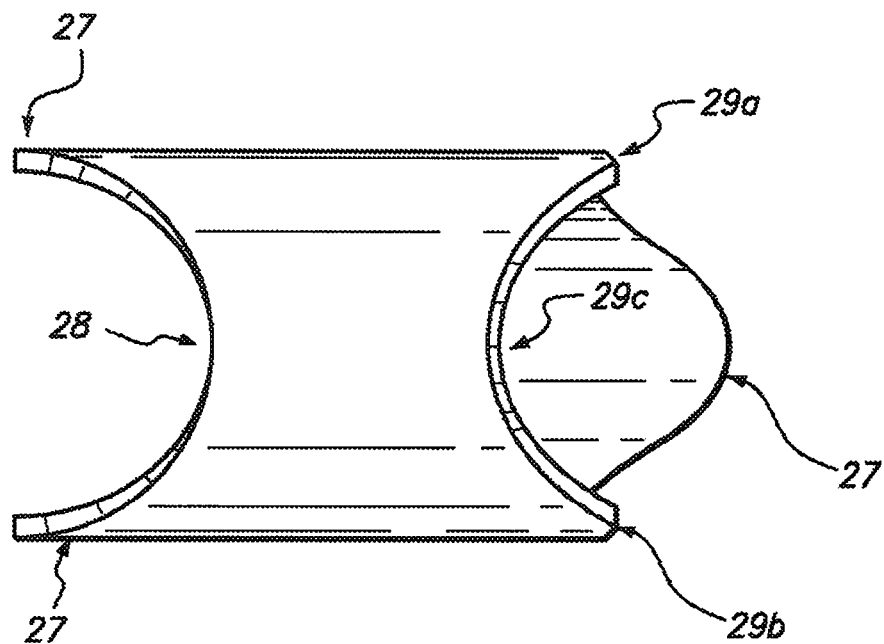
FIG. 4 shows a top view of the corner fitting of FIG. 1.
Figure 5:
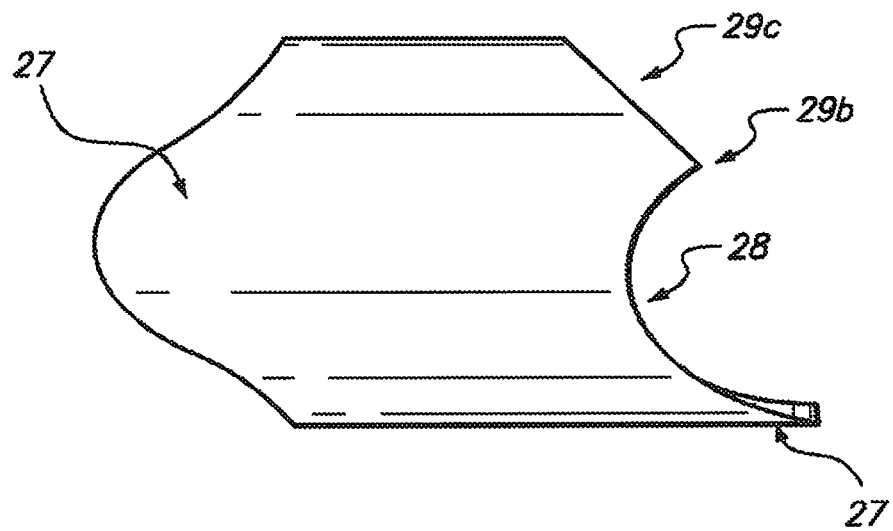
FIG. 5 shows a left side view of the corner fitting of FIG. 1.
Figure 6:
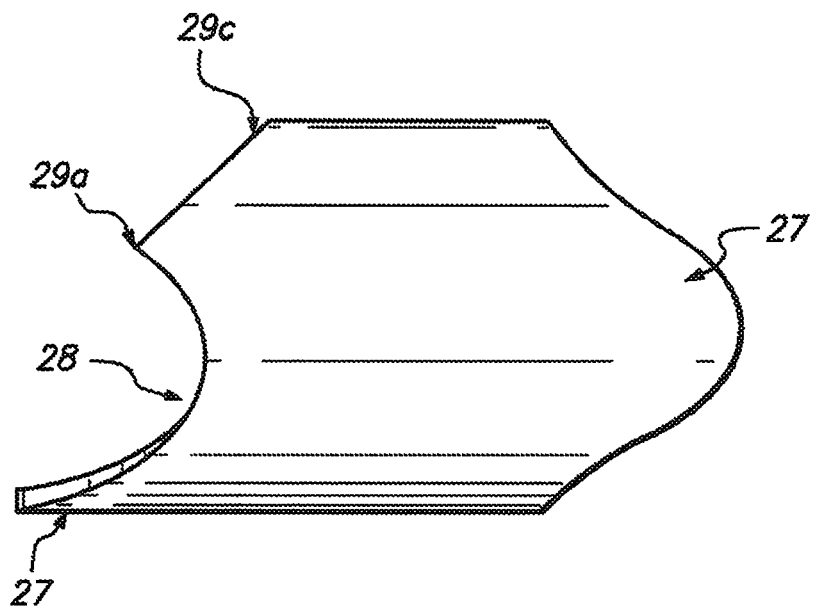
FIG. 6 shows a right side view of the corner fitting of FIG. 1.
Figure 7:
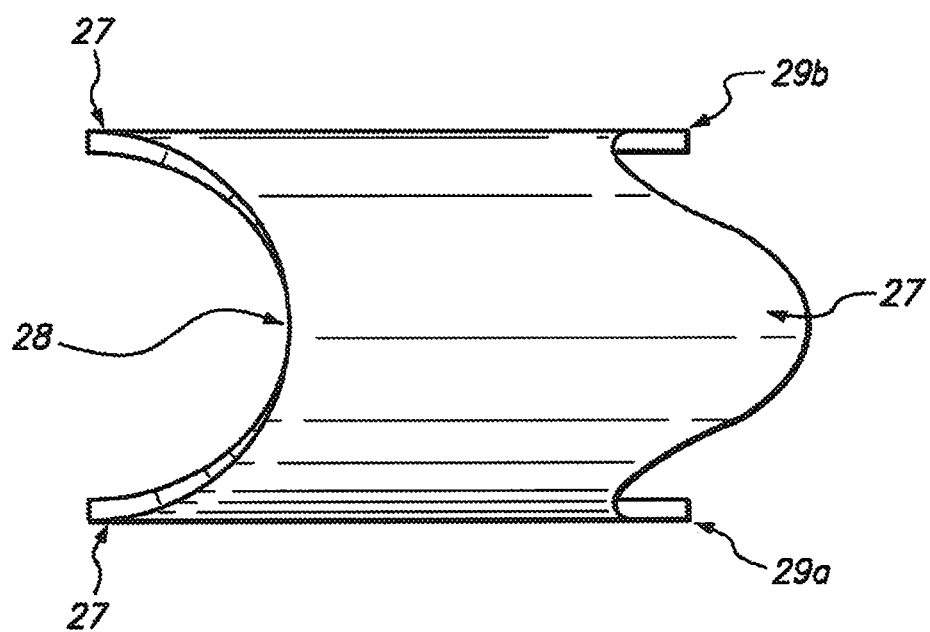
FIG. 7 shows a bottom side view of the corner fitting of FIG. 1.
Figure 8:
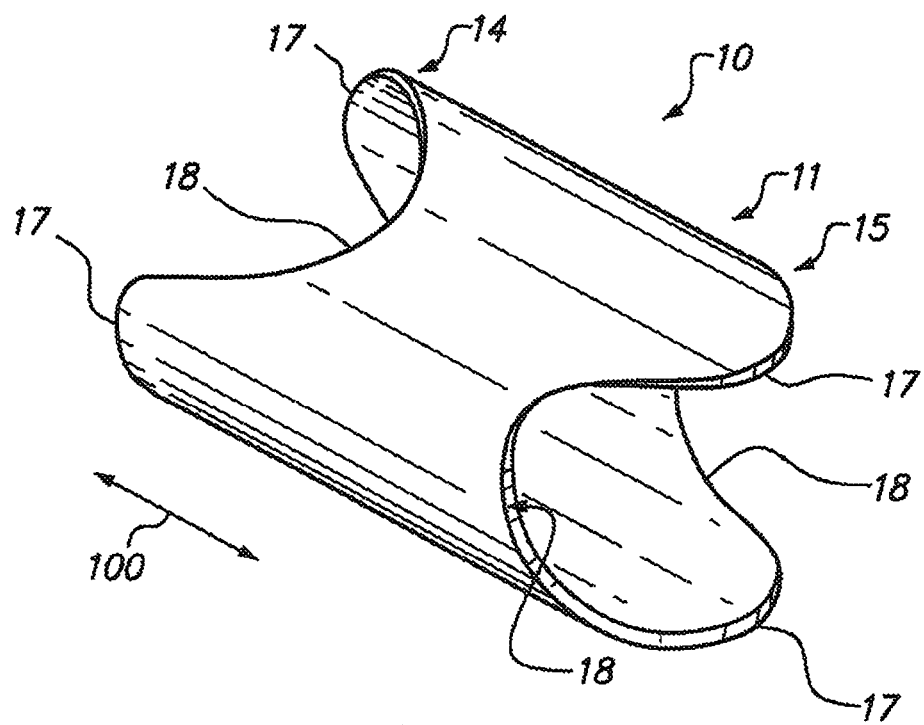
FIG. 8 shows a perspective view of a splice fitting in accordance with an embodiment of the present invention.
Figure 9:
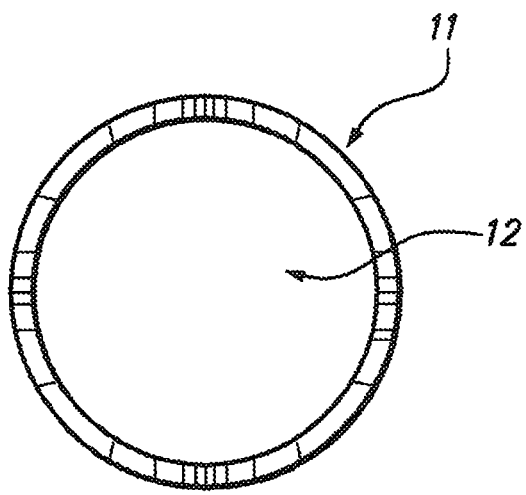
FIG. 9 shows a front view of the splice fitting of FIG. 8.
Figure 10:
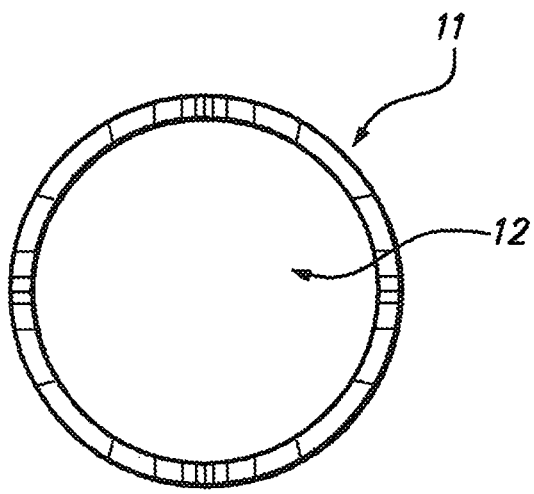
FIG. 10 shows a rear view of the splice fitting of FIG. 8.
Figure 11:
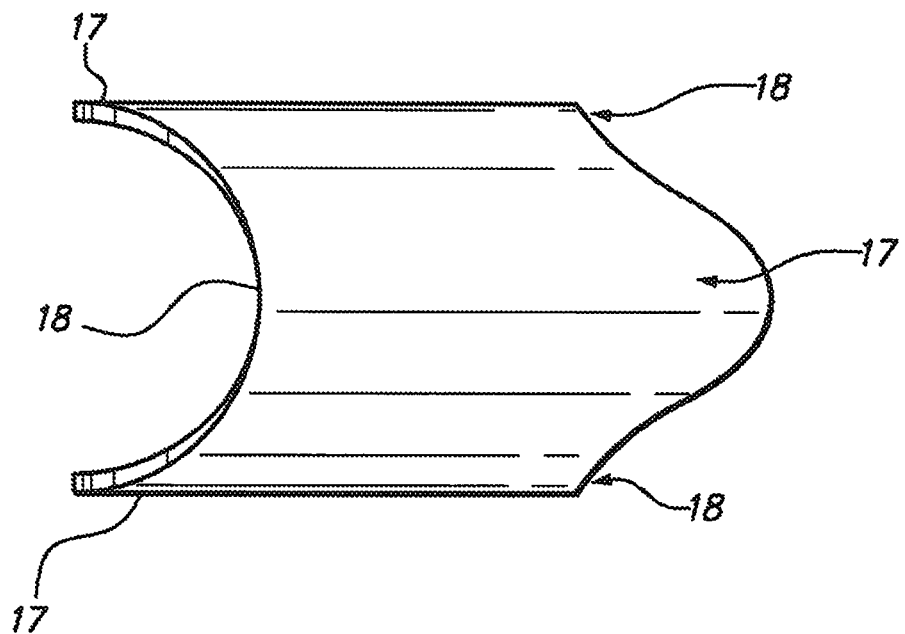
FIG. 11 shows a top view of the splice fitting of FIG. 8.
Figure 12:
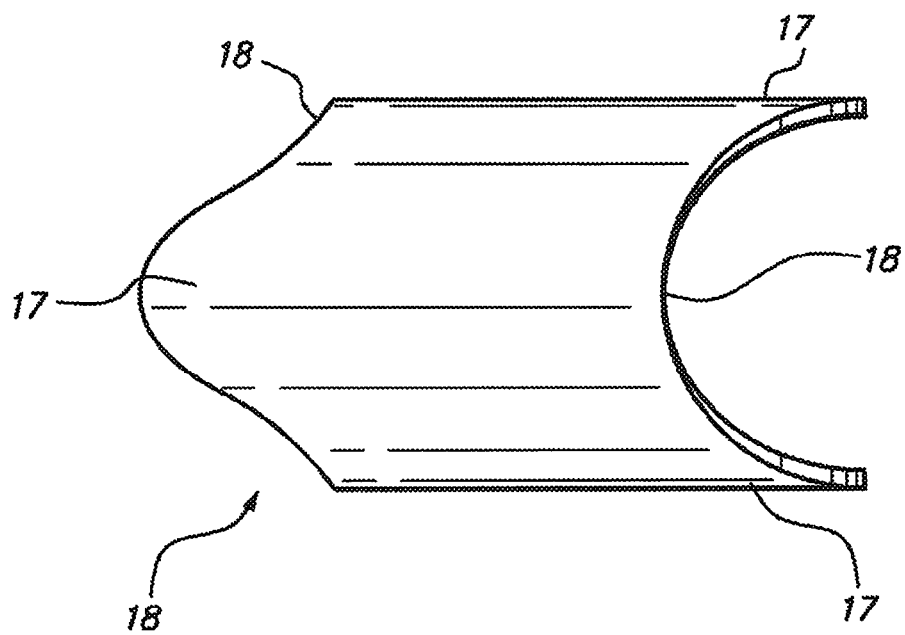
FIG. 12 shows a left side view of the splice fitting of FIG. 8.
Figure 13:
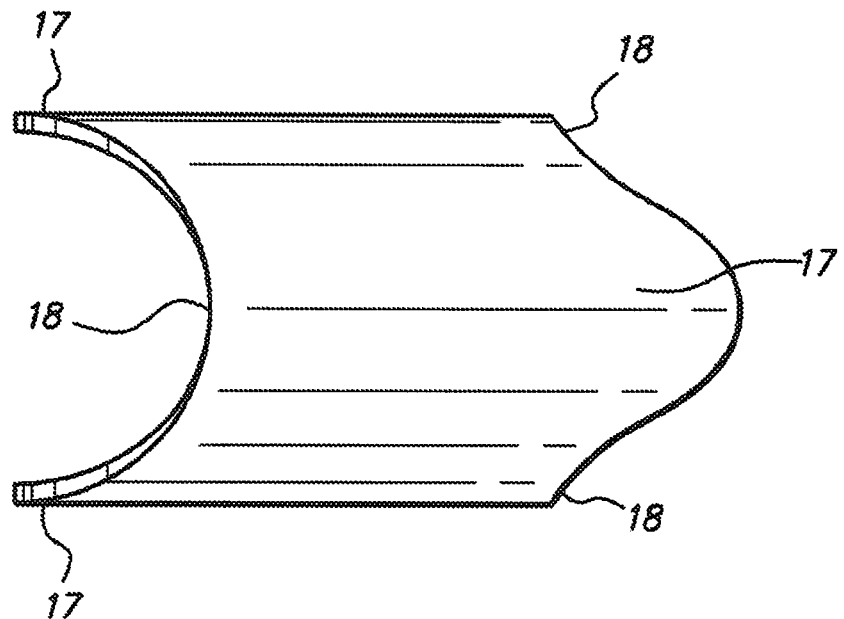
FIG. 13 shows a right side view of the splice fitting of FIG. 8.
Figure 14:
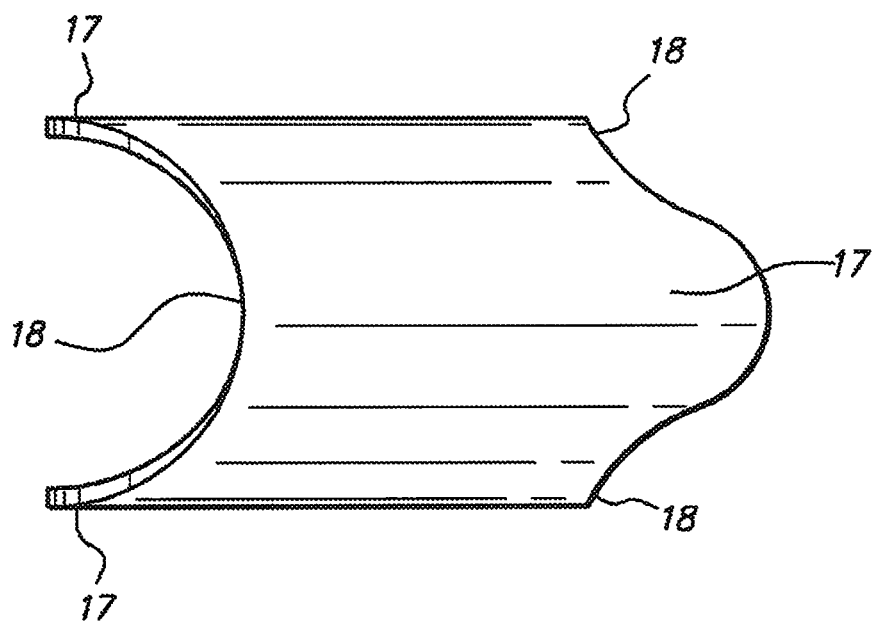
FIG. 14 shows a bottom side view of the splice fitting of FIG. 8.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Reference will now be made in detail to embodiments of the invention, one or more examples of which are illustrated in the drawings. Each example is provided by way of explanation of the invention, and not meant as a limitation on the invention. For example, features illustrated or described as part of one embodiment can be used on another embodiment to yield a still further embodiment. It is intended that the present application include such modifications and variations as come within the scope and spirit of the invention. Repeat use of reference characters throughout the present specification and appended drawings represents the same or analogous features, elements, or steps of the invention.

FIGS. 1 through 7 show an embodiment of a corner fitting (20). The corner fitting (20) includes a sleeve body (21) having a hollow inner space (22) and configured to coaxially fit over a pipe member of a predetermined size. The sleeve body has a first distal end (24) and a second distal end (25) spaced apart from the first distal end (24) in a longitudinal direction (200).

An edge of the sleeve body (21) at the second distal end (25) has a corner cut portion (29), a protruding tab (27), and two recesses (28), the protruding tab (27) protruding farther than the recesses in the longitudinal direction (200). The protruding tab (27) is diametrically opposed to the corner cut portion (29) in the radial direction of the sleeve body (21), and the recesses (28) are diametrically opposed to each other in the radial direction of the sleeve body, such that the recesses (28) are arranged between the protruding tab (27) and the corner cut portion (29) in the circumferential direction of the sleeve body.

Figure 19:
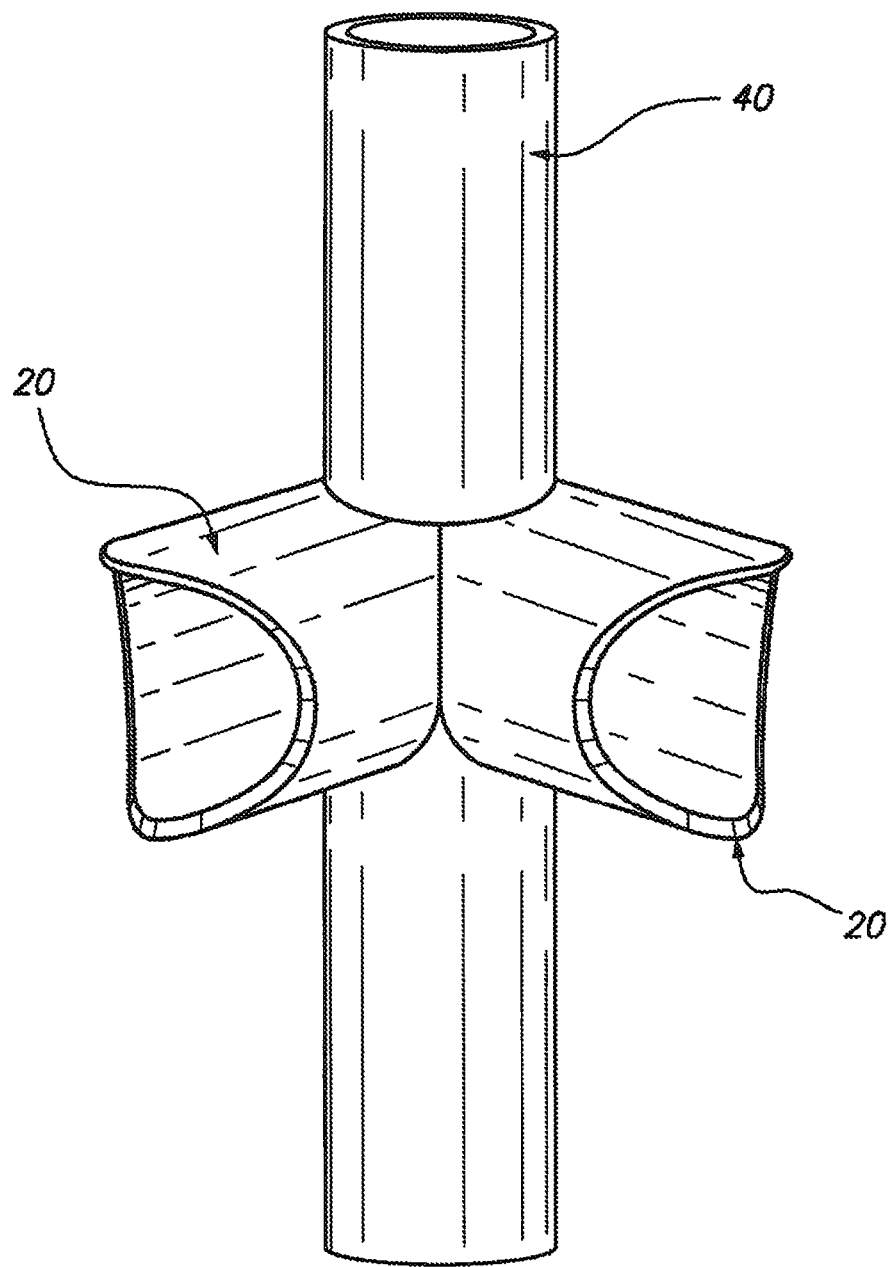
FIG. 19 shows a structure that can be formed with two corner fittings and a pipe member in accordance with an embodiment of the present invention.

The two recesses (28), the protruding tab (27), and the corner cut portion (29) of the second distal end (25) of the sleeve body are configured and arranged such that the second distal end (25) of the sleeve body can fit over the pipe member of the predetermined size with the sleeve body contacting an outer periphery of the pipe member at the recesses (28) and the protruding tab (27) in a state in which a longitudinal axis of the pipe member is perpendicular to a longitudinal axis of the sleeve body (21) and the pipe member is nested in the recesses (28) of the second distal end (25). The corner cut portion (29) is configured and shaped such that the sleeve body fits together with a corner cut portion of an identical sleeve body or substantially identical sleeve body, as shown in FIG. 19. In other words, the two sleeve bodies are identical or very similar in structural configuration, and in particular the depth, angle, and curvature of the corner cut portion. The two corner fittings can be disposed on the pipe member (30) of the predetermined size in an arrangement with the longitudinal axes of the two sleeve bodies being transverse with respect to each other while the corner cut portions (29) of the two sleeve bodies contact each other and the pipe is nested between the protruding tabs (27) of the second distal ends (25) of the two sleeve bodies. This arrangement of two corner fittings forms a corner joint, as shown in FIG. 19. The corner cut portions (29) make constant contact with each other around their entire circumferential extent, and the remainder of the edge of each sleeve body makes constant contact around its entire circumferential extent with the pipe member (30).

An edge of the sleeve body at the first distal end has two protruding tabs (27) and two recesses (28), the protruding tabs (27) protruding farther than the recesses (28) in the longitudinal direction (200). The protruding tabs (27) are diametrically opposed to each other in a radial direction of the sleeve body, and the recesses (28) are diametrically opposed to each other in the radial direction of the sleeve body, such that the protruding tabs and the recesses are arranged alternately around a circumferential direction of the sleeve body.

The two protruding tabs (27) and the two recesses (28) of the first distal end (24) of the sleeve body are configured and arranged such that the first distal end (24) of the sleeve body (21) can fit over the pipe member of the predetermined size with the sleeve body contacting an outer periphery of the pipe member at the protruding tabs (27) and at the recesses (28). The longitudinal axis of the pipe member is perpendicular to a longitudinal axis of the sleeve body (21) and the pipe member is nested in the recesses (28) and between the two protruding tabs (27), and constant contact is maintained around the entire edge of the sleeve body (21). Such a configuration allows for an H-joint to be formed such as that shown in FIG. 18, and also allows for a T-joint (i.e. upright connector) to be formed such as that shown in FIG. 25.

The corner cut portion includes two knobs (29a, 29b) and an arcuate recess (29c) extending inwardly in the longitudinal direction of the sleeve body (21) between the two knobs (29a, 29b). A first one of the two knobs (29a) is contiguous with one of the recesses at the second distal end of the sleeve body and the other of the two knobs (29b) is contiguous with the other of the recesses at the second distal end of the sleeve body. The arcuate recess (29c) of the corner cut portion (29) is configured such that the sleeve body fits together with an identical sleeve body at a predetermined angle with the corner cut portions contacting each other over an entirety of each corner cut portion. In other words, the corner cut portion has a depth and curvature so as to form a predetermined angle when paired with another such sleeve body in a mirror image arrangement such as that shown in FIGS. 19 and 20.

The angle formed by the corner fitting can be 90 degrees, 45 degrees, 22.5 degrees or the like. Specifically, a corner fitting can be made which will result in a desired angle ranging from 5 degrees to 90 degrees. Each corner fitting forms one predetermined angle, and is usually to be used with a corner fitting corresponding to the same predetermined angle. Accordingly, a user will select corner fittings based on the desired angle to be formed and/or according to the specifications of the structure being built. The corner fitting is an out-of-the-box fitting, which is to say that it is pre-fabricated and distributed in standardized sizes corresponding to the diameters of pipes which are most often used. This allows the end user to avoid the delay and imprecision of forming connections by shaping the ends of the pipe members themselves.

The above-described configuration of a corner fitting advantageously facilitates the creation of several different types of joints with the same member, thereby eliminating the need for hand-crafting the ends of pipe members to fit together. In particular, the corner fitting can be used to create a corner joint, an H-joint, a T-joint, and can also be used to connect pipe members end-to-end. Accordingly, a person who wishes to construct a fence, storage shed, dwelling, or other structure using pipe as a structural load bearing member can obtain several corner fittings or several dozen corner fittings, depending on need, and select and use each individual corner fitting based on the type of joint desired. It is thus appreciated that a corner fitting can be used as a universal fitting.

When the corner fitting is disposed to coaxially fit over a pipe member, a clearance between the fitting and the pipe member is not more than ¼ of an inch, and is preferably not more than 1/32 of an inch. As such, the fitting is in close contact with the pipe member, and a strong structural unit can be formed by the overlap and close contact of the fitting and pipe member when these two pieces are connected.

The sleeve body of the present invention is made of ASTM or ASTM A283C steel in one embodiment. In other embodiments the sleeve body can be made of any carbon steel or other suitable material. The present invention can be used with pipe of any type of steel or metal, including standard steel pipes, line steel pipes, aluminum pipes, and copper pipes. Aluminum or copper pipes could be brazed instead of welded, or alternatively could be fixed with self-tapping screws or the like.

FIGS. 8 through 14 show an embodiment of a splice fitting (10). The splice fitting (10) includes a sleeve body (11) having a hollow inner space (12) and configured to coaxially fit over a pipe member of a predetermined size. The sleeve body of the splice fitting has a first distal end (14) and a second distal end (15) spaced apart from the first distal end (14) in a longitudinal direction (100). An edge of the sleeve body of the splice fitting at the first distal end has two protruding tabs (17) and two recesses (18). The protruding tabs (17) protrude farther than the recesses (18) in the longitudinal direction. The protruding tabs (17) are diametrically opposed to each other in a radial direction of the sleeve body, and the recesses (18) are diametrically opposed to each other in the radial direction of the sleeve body, such that the protruding tabs (17) and the recesses (18) are arranged alternately around a circumferential direction of the sleeve body. The second distal end (15) of the sleeve body (11) has the same or substantially the same shape as the first end (14). The protruding tabs (17) of the first distal end (14) may be offset by 90 degrees from the protruding tabs (17) of the second distal end (15)

Figure 16:
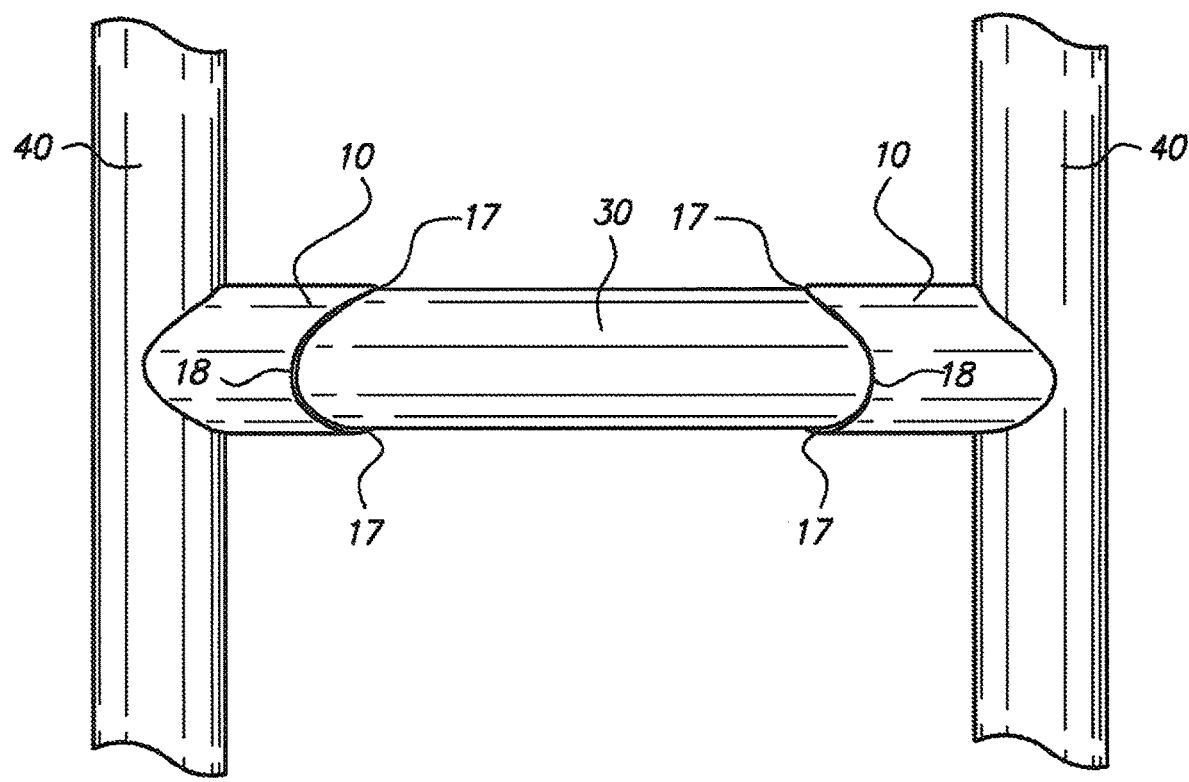
FIG. 16 shows a structure that can be formed with two splice fittings disposed on a pipe member and interposed between two vertical pipe members in accordance with an embodiment of the present invention.
Figure 17:
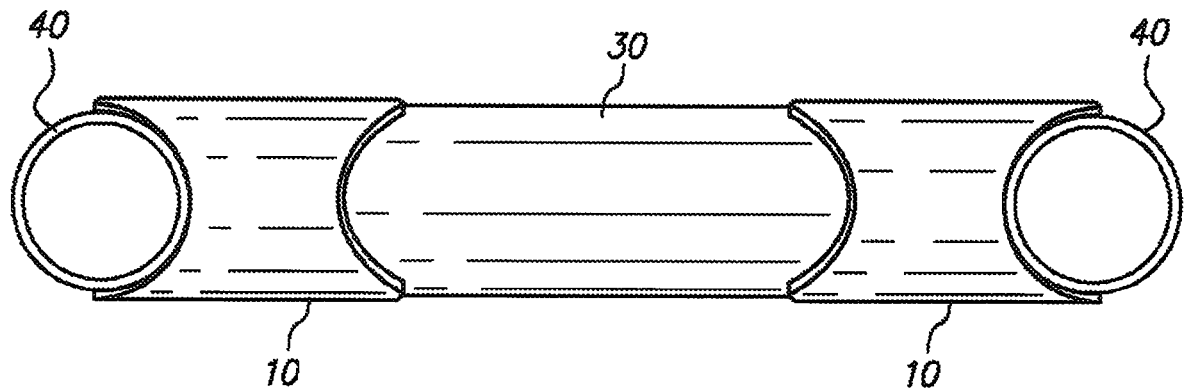
FIG. 17 shows a top view of the structure of FIG. 16.

As shown in FIGS. 16 and 17, the two protruding tabs (17) and the two recesses (18) are configured and arranged such that either end of the sleeve body (11) can fit over the pipe member of the predetermined size with the sleeve body (11) contacting an outer periphery of the pipe member at the protruding tabs (17) and at the recesses (18). The longitudinal axis of the pipe member is perpendicular to a longitudinal axis of the sleeve body and the pipe member is nested in the recesses and between the two protruding tabs, and constant contact with the pipe member is maintained around the entire edge of the sleeve body (11). Such a configuration allows for an H-joint to be formed such as that shown in FIG. 16, and also allows for a T-joint to be formed such as that shown in FIG. 24.

Figure 15:
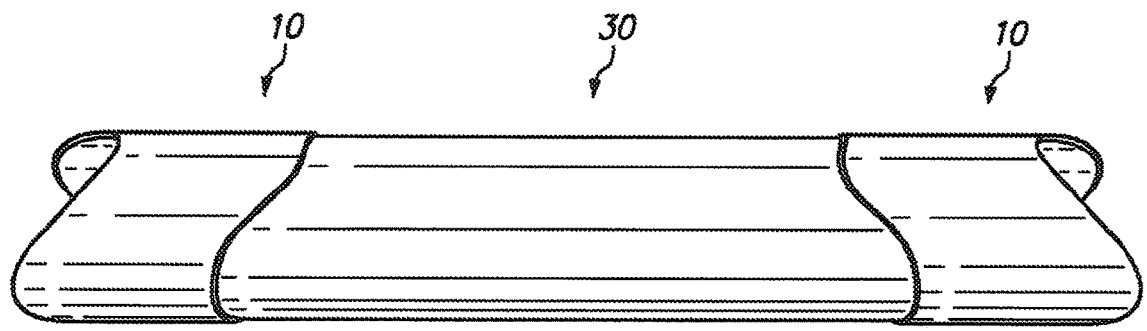
FIG. 15 shows two splice fittings disposed on a pipe member in accordance with an embodiment of the present invention.
Figure 18:
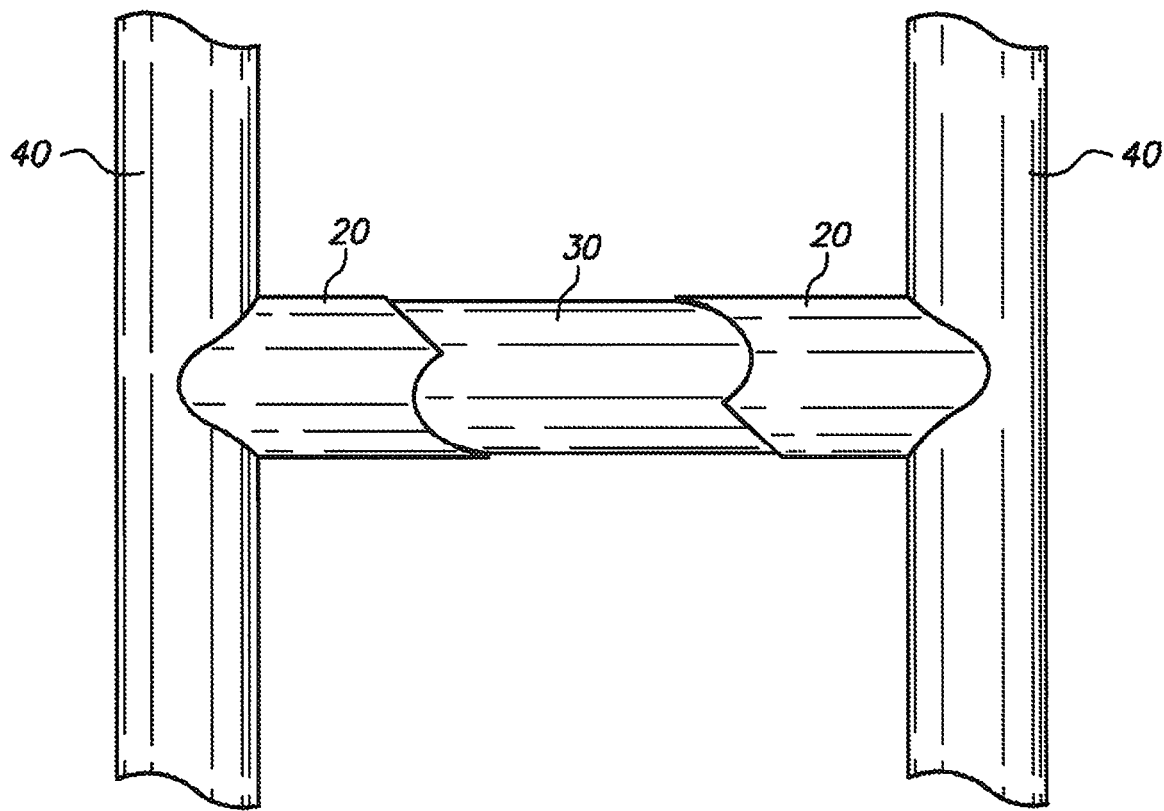
FIG. 18 shows a front view of a structure formed with two corner fittings disposed on a pipe member and interposed between two vertical pipe members in accordance with an embodiment of the present invention.

FIGS. 15 through 28 show different joints that can be formed by the above-described corner fitting and splice fitting in accordance with embodiments of the present invention. FIG. 15 shows two splice fittings (10) disposed on a horizontal pipe member (30). FIG. 16 shows a structure that can be formed with two splice fittings (10) disposed on a pipe member (30) and interposed between two vertical pipe members (40). FIG. 17 shows a top view of the structure of FIG. 16. FIG. 18 shows a front view of a structure formed with two corner fittings (20) disposed on a pipe member (30) and interposed between two vertical pipe members (40). The vertical pipe members (40) of FIGS. 16 and 18 may be, for instance, fence posts for a fence structure or load bearing members of a dwelling structure or shed.

Figure 20:
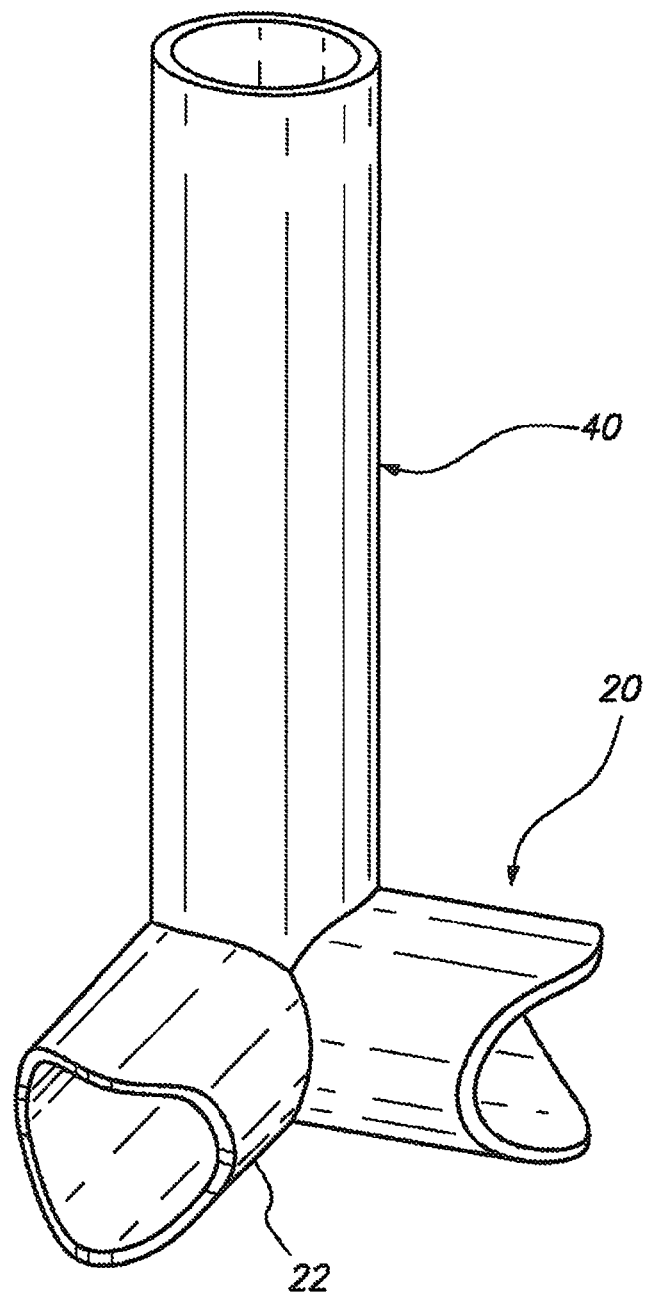
FIG. 20 shows a structure that can be formed with two corner fittings and a pipe member in accordance with an embodiment of the present invention.
Figure 21:
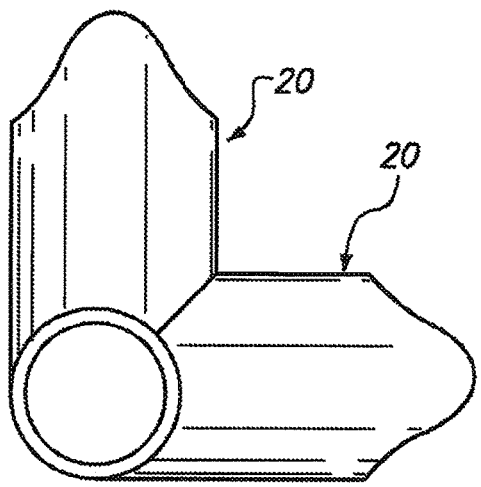
FIG. 21 shows a top view of the structure of FIG. 20.
Figure 22:
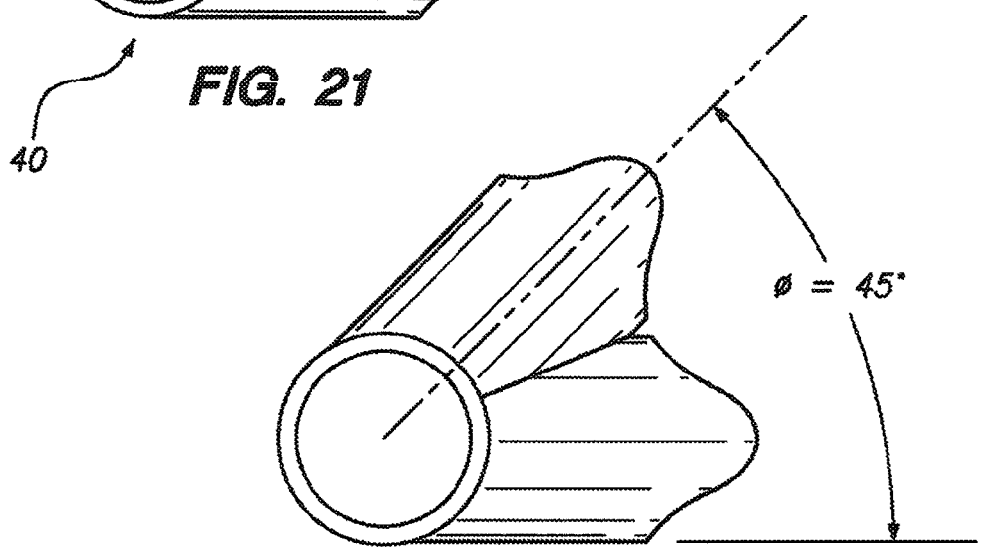
FIG. 22 shows a top view of a corner fitting at an angle θ of 45 degrees in accordance with an embodiment of the present invention.
Figure 23:
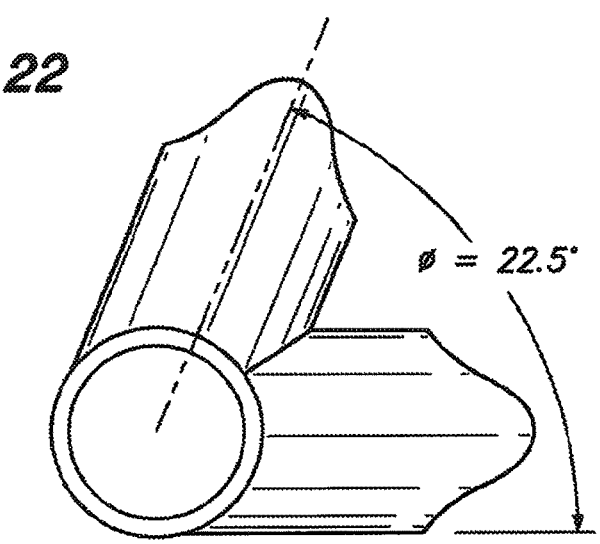
FIG. 23 shows a top view of a corner fitting at an angle θ of 22.5 degrees in accordance with an embodiment of the present invention.

FIG. 19 shows a corner joint that can be formed with two corner fittings (20) and a pipe member (40). FIG. 20 shows another corner joint that can be formed with two corner fittings (20) and a pipe member (40). FIG. 21 shows a top view of the structure of FIG. 20. FIG. 22 shows a top view of a corner fitting at an angle θ other than 90 degrees. The angle θ shown in FIG. 22 is 45 degrees, but in other embodiments the angle may be any desired angle. FIG. 23 shows a top view of a corner fitting at an angle θ of 22.5 degrees. A corner joint can be used at a corner of a fence, a corner of a dwelling structure, a corner of a shed, or the like.

Figure 24:
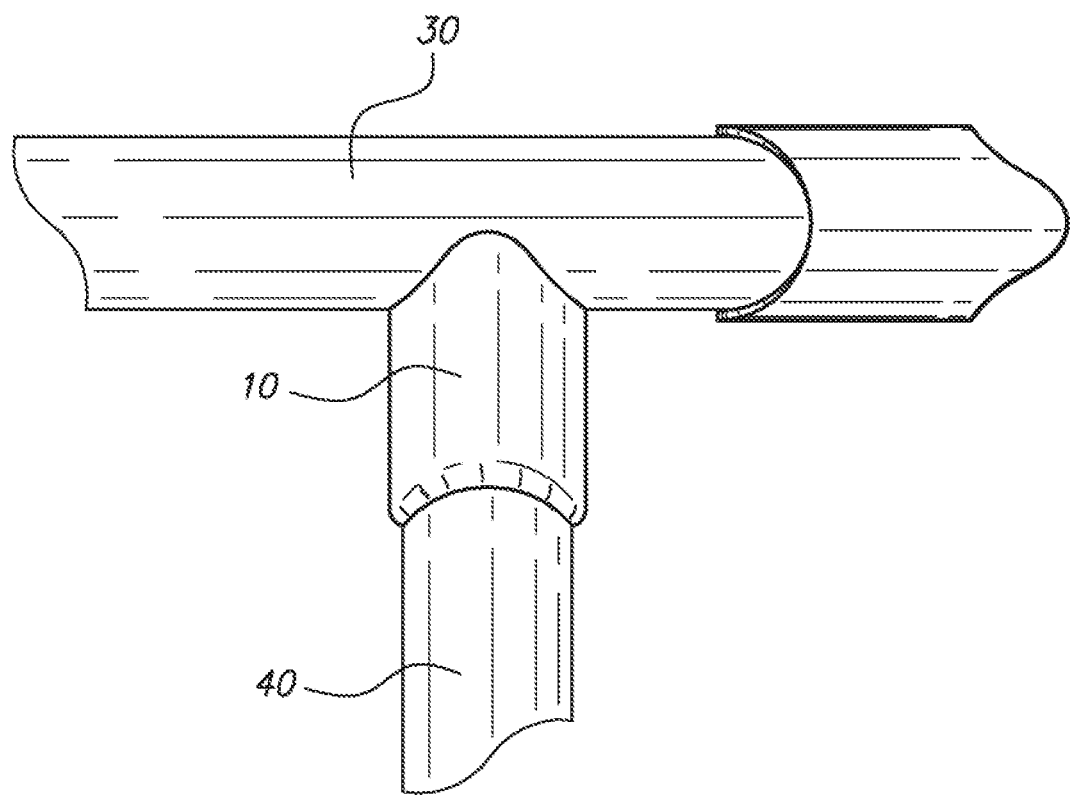
FIG. 24 shows a splice fitting used as an upright connector in accordance with an embodiment of the present invention.
Figure 25:
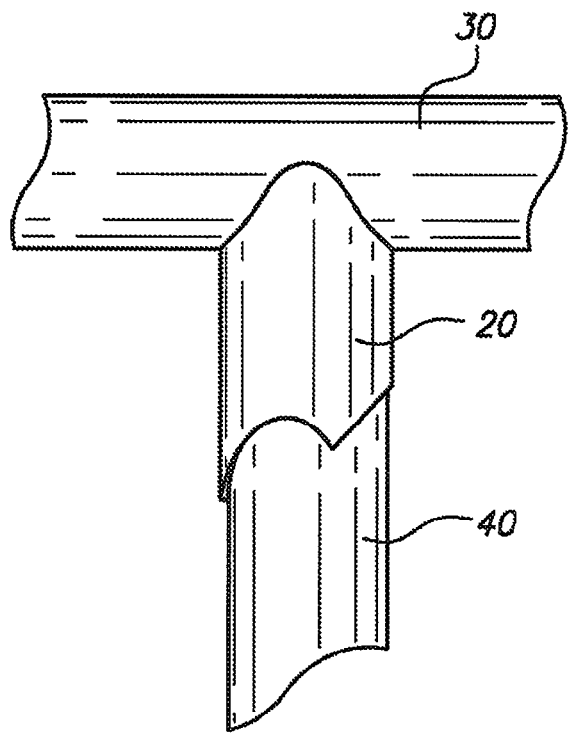
FIG. 25 shows a side view of a corner fitting used as an upright connector in accordance with an embodiment of the present invention.
Figure 26:
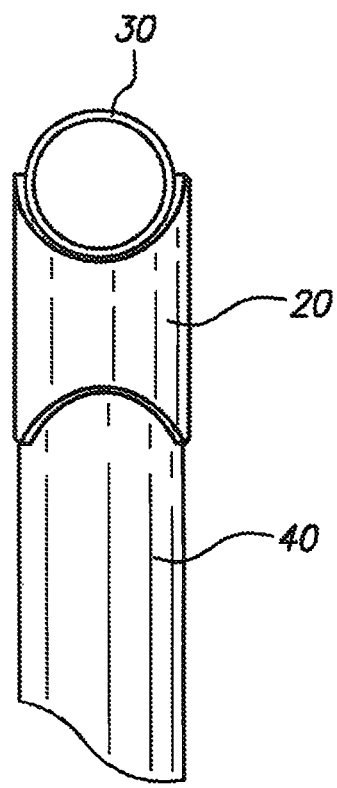
FIG. 26 shows a different side view of a corner fitting used as an upright connector in accordance with an embodiment of the present invention.

FIG. 24 shows a splice fitting used (10) as an upright connector between a vertical pipe member (40) and a horizontal pipe member (30). FIG. 25 shows a side view of a corner fitting (20) used as an upright connector. The upright connector can be used to form a top rail of a fence, a hand railing, or a topmost horizontal load bearing member of a shed or the like. FIG. 26 shows a different side view of a corner fitting used as an upright connector.

Figure 27:
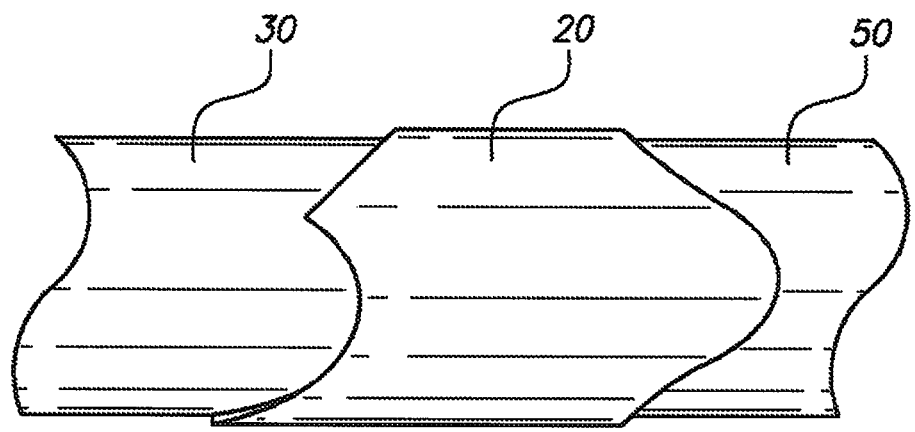
FIG. 27 shows a corner fitting used as an end-to-end connector in accordance with an embodiment of the present invention.
Figure 28:
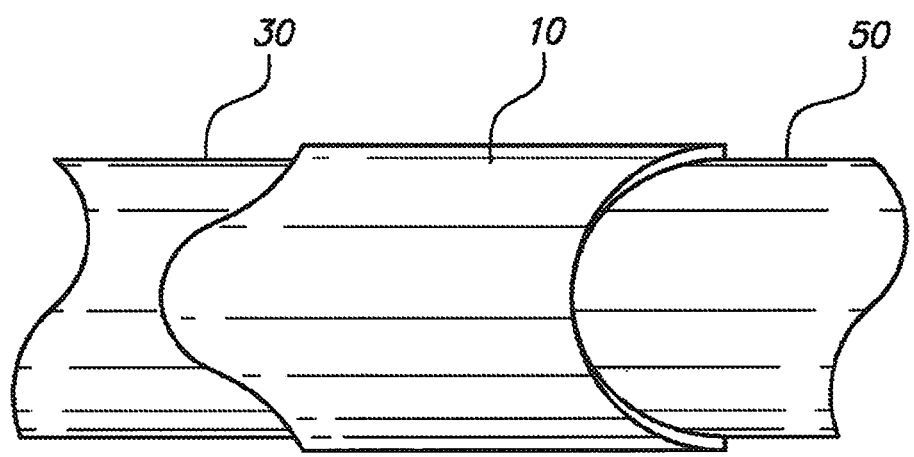
FIG. 28 shows a splice fitting used as an end-to-end connector in accordance with an embodiment of the present invention.

FIG. 27 shows a corner fitting (20) used as an end-to-end connector of pipe member (30) and pipe member (50) with longitudinal axes that are parallel or substantially parallel. FIG. 28 shows a splice fitting used as an end-to-end connector of pipe member (30) and pipe member (50) with longitudinal axes that are parallel or substantially parallel. An end-to-end connection can be desirable to connect two pipe members which form the top rail of a fence, for example.

Figure 29:
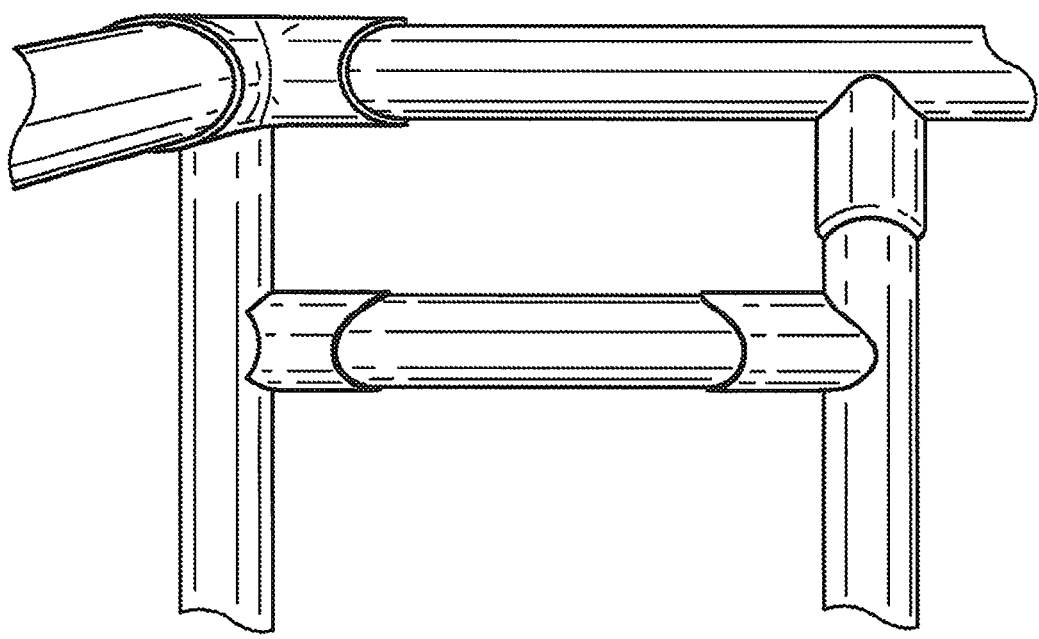
FIG. 29 shows a structure formed of multiple splice fittings and multiple corner fittings in accordance with an embodiment of the present invention.
Figure 30:
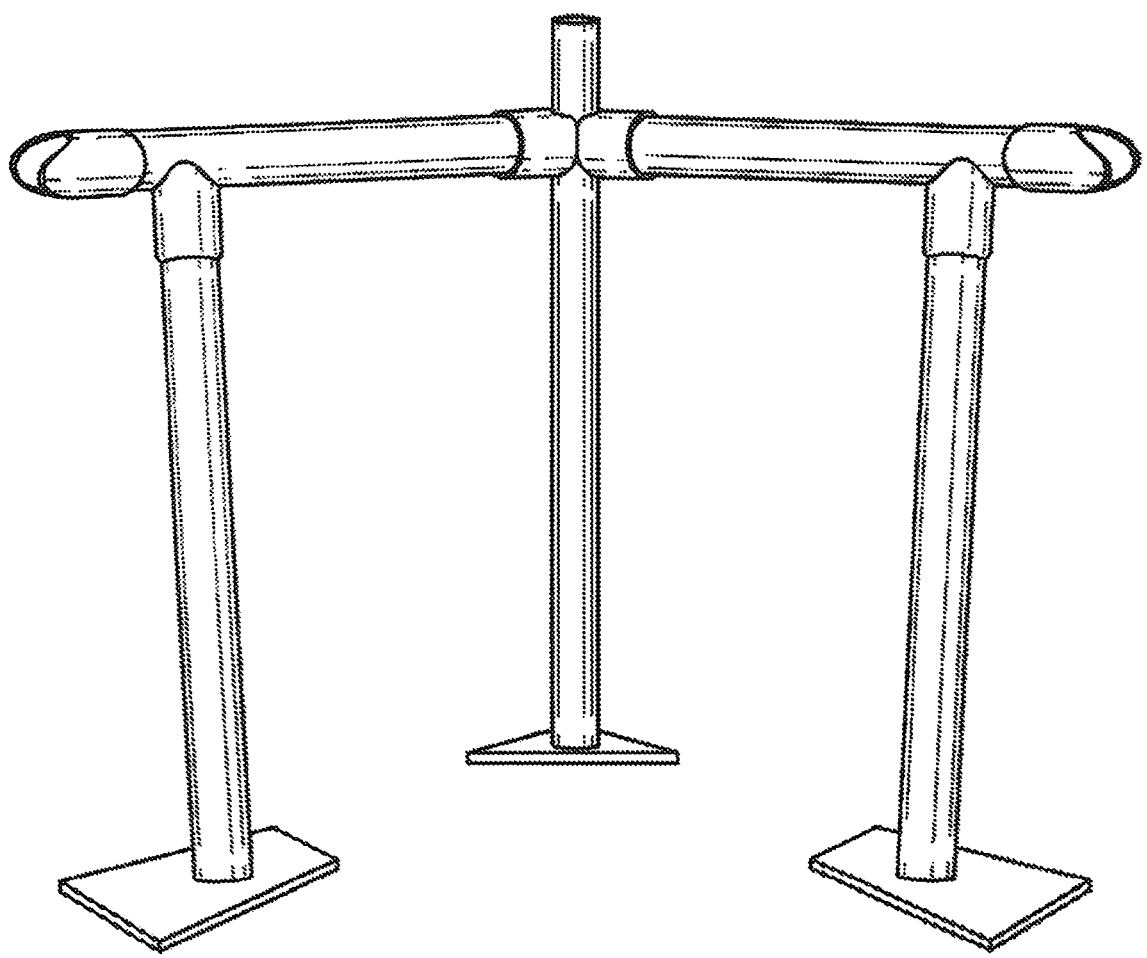
FIG. 30 shows a fence structure formed of multiple splice fittings and multiple corner fittings in accordance with an embodiment of the present invention.

FIG. 29 shows a structure formed of multiple splice fittings (10) and multiple corner fittings (20). FIG. 30 shows a fence structure formed of multiple splice fittings (10) and multiple corner fittings (20). As can be appreciated from the examples of FIGS. 29 and 30, the variety of structures which can be constructed using the present invention is virtually limitless.

Figure 31:
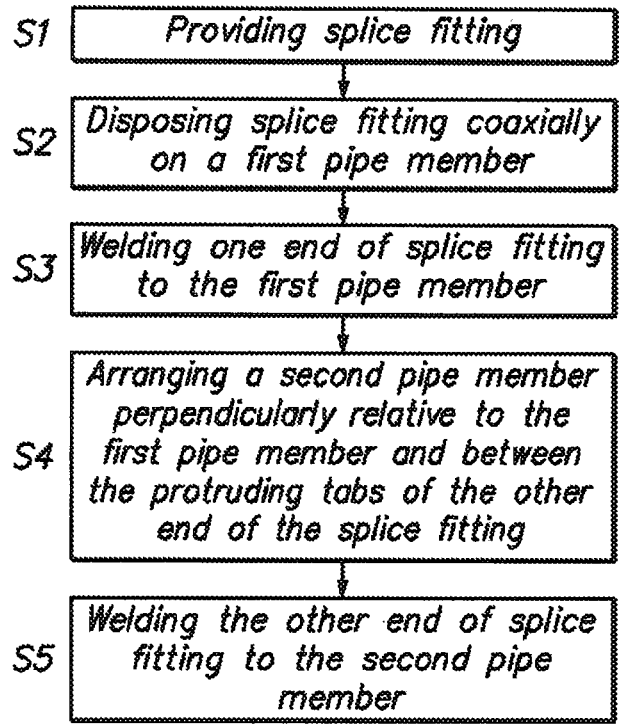
FIG. 31 shows a flow chart illustrating a method of building a structure including a splice fitting in accordance with an embodiment of the present invention.

FIG. 31 shows a flow chart illustrating a method of building a structure including a splice fitting. A splice fitting is provided or obtained in step 1 of the method, and in step 2 the splice fitting is disposed coaxially on a first pipe member. One end of the splice fitting is welded to the first pipe member in step 3, resulting in the arrangement shown in FIG. 24 between pipe member (40) and splice fitting (10). In step 4, a second pipe member is arranged perpendicular relative to the first pipe member and between the protruding tabs of the other end of the splice fitting, resulting in the arrangement shown in FIG. 24 between pipe member (30) and splice fitting (10). In step 5, the other end of the splice fitting is welded to the second pipe. In such a manner, a T-joint or upright connector is fabricated. Such a joint is disposed within a larger structure in accordance with the specifications of the structure being built.

Figure 32:
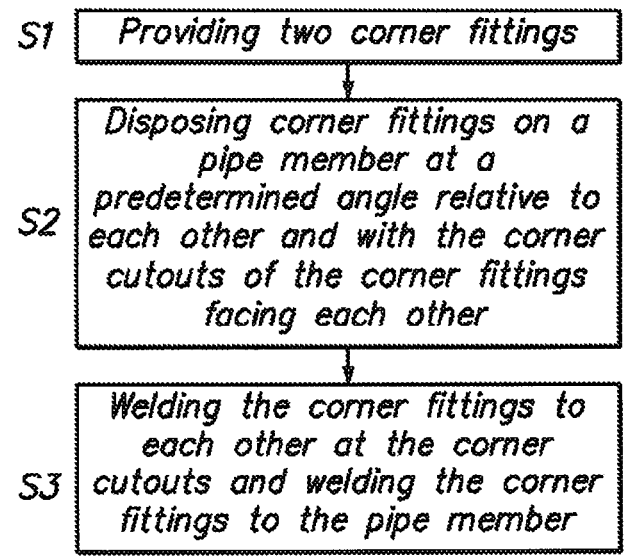
FIG. 32 shows a flow chart illustrating a method of building a structure including a corner fitting in accordance with an embodiment of the present invention.

FIG. 32 shows a flow chart illustrating a method of building a structure including two corner fittings arranged to create a corner joint. Two corner fittings are provided or obtained in step 1 of the method. The two corner fittings will usually be corner fittings which are identical in the depth, angle, and curvature of the corner cut portion, and thereby constitute two corner fittings configured to create the same predetermined angle. In step 2 the two corner fittings are then arranged with the corner cut portions contacting each other and with a pipe member nested between the protruding tabs, resulting in the arrangement shown in any of FIGS. 19-23. In step 3, the corner fittings are welded to each other and to the pipe member, thereby creating a corner joint. Such a joint is disposed within a larger structure in accordance with the specifications of the structure being built.

As can be appreciated from FIGS. 31 and 32, the variety of structures which can be constructed using the present invention is virtually limitless.

The present invention is particularly advantageous with respect to drill pipe because there are millions of feet of used or discarded drill pipe. This material can be reclaimed and recycled by constructing a structure therefrom. Such recycling is particularly advantageous in view of the fact that oil drilling is often undertaken in remote regions where materials and resources are limited. The term "drill pipe" as used herein refers to oilfield drill pipe of the general type disclosed in U.S. Pat. Nos. 6,244,631 and 5,505,502, the contents of both of which are hereby incorporated by reference herein in their entirety.

However, the present invention is not strictly limited to used or reclaimed drill pipe. The present invention can be used with pipe of any type of steel or metal, including standard steel pipes, line steel pipes, aluminum pipes, and copper pipes. Aluminum or copper pipes could be brazed instead of welded, or alternatively could be fixed with self-tapping screws or the like. The sleeve body of the corner fitting or splice fitting is made of ASTM or ASTM A283C steel in one embodiment. In other embodiments the sleeve body can be made of any carbon steel or other suitable material.

Figure 33:
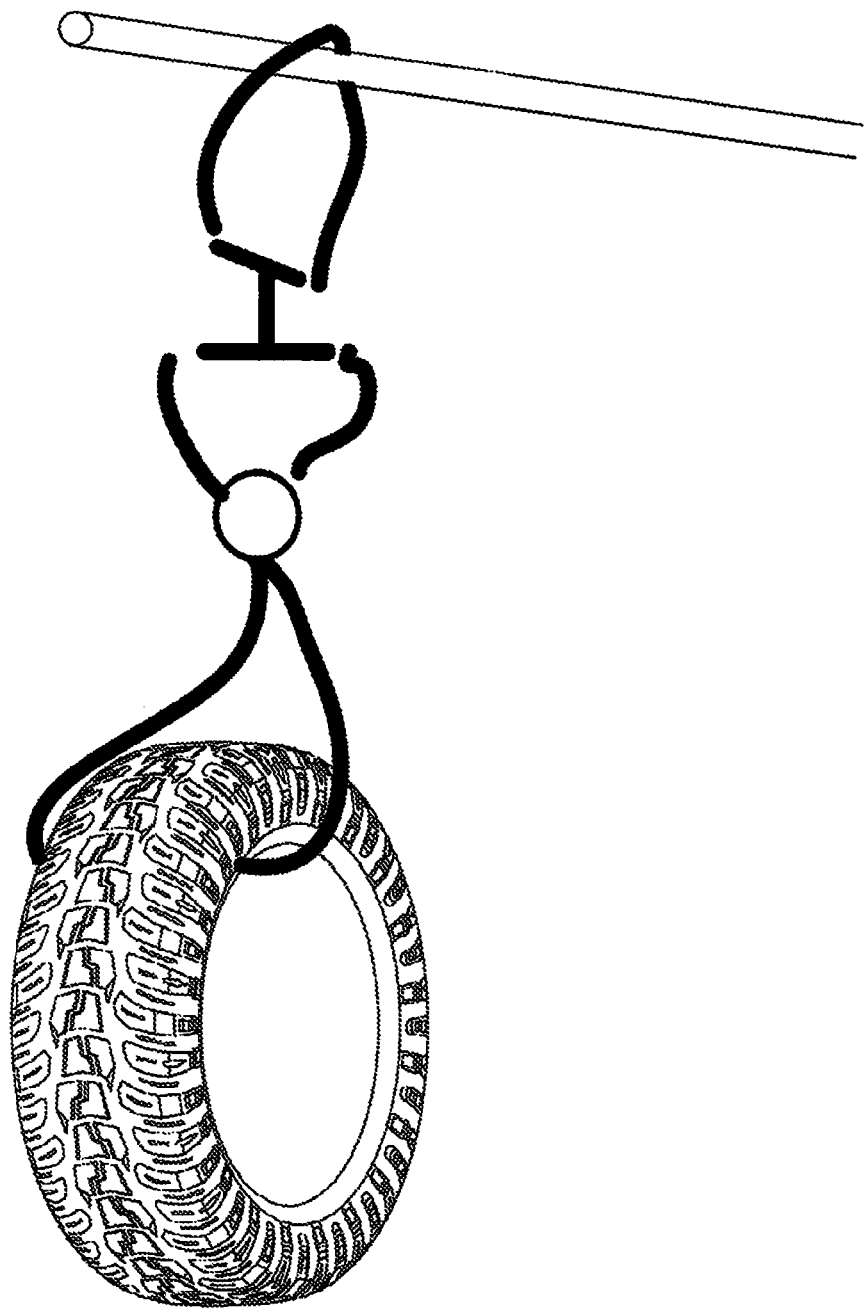
FIG. 33 shows a strength test of a structural member made from sleeve bodies in accordance with an embodiment of the present invention.

An embodiment of the present invention also enhances weld strength by creating a capillary action which causes the weld to be sucked into the fitting between the sleeve body and the pipe member. This is possible with the use of magnetically complimentary steel materials for the sleeve body and the pipe member. FIG. 33 shows a strength test of a structural member made from sleeve bodies of the present invention.

Sleeve bodies are welded to pipe members in one embodiment, and the welding can be wire feed welding, stick welding, or brazing. Self-tapping screws, drill and bolt connections, epoxy, other types of adhesives, and/or the like can be used in other embodiments.

Particular embodiments that are used with reclaimed drill pipe are sized specifically for use with designated sizes of drill pipe. For instance, an end user who has many linear feet of 2.875 inch drill pipe (2 and ⅞ths inch outside diameter) would obtain corner fittings and/or splice fittings which are sized for use with 2.875 inch drill pipe. An end user can obtain corner fittings and splice fittings based on the diameter of pipe which is expected to be used, the type of structures expected to be built, and the angles which need to be formed. Sizes for drill pipe vary, and can go up to a diameter of approximately 7.5 inches; other applications may use even bigger pipe.

Because an individual corner fitting fits coaxially over a pipe of a predetermined size in an arrangement such as that shown in FIG. 27, and also has a first distal end which fits over a pipe of the same predetermined size with the longitudinal axis of the pipe being perpendicular to the longitudinal axis of the fitting in an arrangement such as that shown in FIG. 18, and also fits together with a similar corner fitting to create a corner joint on a pipe of the same predetermined size in an arrangement such as that shown in FIG. 19, each individual corner fitting is capable of creating several different types of joints with a given size of pipe. For instance, when the fitting is sized to be used with 2.875 inch drill pipe, the fitting can create the coaxial joint or end-to-end joint shown in FIG. 27, the T-joint shown in FIG. 18, and the corner joint shown in FIG. 19 all with pipe having an outer diameter of 2.875 inches. In the same manner, a splice fitting sized to be used with 2.875 inch drill pipe can create a coaxial or end-to-end joint shown in FIG. 28 and the T-joint shown in FIG. 24 both with pipe having an outer diameter of 2.875 inches.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A method comprising:
providing a vertical pipe member;
providing a first pipe member disposed orthogonal to the vertical pipe member;
providing a second pipe member disposed orthogonal to the first pipe member and the vertical pipe member with the first and the second pipe members disposed in coplanar relationship to each other;
providing a first corner fitting including:
(i) a first sleeve body having a hollow inner space and configured to coaxially fit over a first pipe member of a predetermined size,
(ii) wherein the first sleeve body has a first distal end and a second distal end spaced apart from the first distal end in a longitudinal direction,
(iii) wherein an edge of the first sleeve body at the first distal end has two protruding tabs and two recesses, the protruding tabs protruding farther than the recesses in the longitudinal direction, the protruding tabs being diametrically opposed to each other in a radial direction of the first sleeve body, and the recesses being diametrically opposed to each other in the radial direction of the first sleeve body, such that the protruding tabs and the recesses are arranged alternately around a circumferential direction of the first sleeve body,
(iv) wherein the two protruding tabs and the two recesses of the first distal end of the first sleeve body are configured and arranged such that the first distal end of the first sleeve body fits over the first pipe member of the predetermined size with the first sleeve body contacting an outer periphery of the first pipe member at the protruding tabs, and
(v) wherein an edge of the first sleeve body at the second distal end has a corner cut portion, a protruding tab, and two recesses, the protruding tab protruding farther than the recesses in the longitudinal direction, the protruding tab being diametrically opposed to the corner cut portion in the radial direction of the first sleeve body, and the recesses being diametrically opposed to each other in the radial direction of the first sleeve body, such that the recesses are arranged between the protruding tab and the corner cut portion in the circumferential direction of the first sleeve body,
providing a second corner fitting identical to the first corner fitting wherein the corner cut portion of the first and second corner fitting are configured and shaped such that the first sleeve body fits together with an identical second sleeve body on the vertical pipe member of the predetermined size in an arrangement with the longitudinal axes of the two sleeve bodies being transverse with respect to each other with the corner cut portions of the two sleeve bodies contacting each other and the vertical pipe member being nested between the protruding tabs of the second distal ends of the two sleeve bodies; and
creating a corner joint by welding the cut corner portions of the first corner fitting and the second corner fitting to each other and welding the first corner fitting and the second corner fitting to the vertical pipe member with the vertical pipe member being disposed between the protruding tabs of the second distal ends of the first corner fitting and the second corner fitting.

2. The method of claim 1, wherein the two recesses, the protruding tab, and the corner cut portion of the second distal end of the first and second sleeve body are configured and arranged such that the second distal end of the first and second sleeve body fits over the first and second respective pipe members of the predetermined size with the sleeve body contacting an outer periphery of the vertical pipe member at the recesses and the protruding tab in a state in which a longitudinal axis of the vertical pipe member is perpendicular to a longitudinal axis of the sleeve body and the vertical pipe member is nested in the recesses of the second distal ends, wherein the corner cut portion includes two knobs and an arcuate recess extending inwardly in the longitudinal direction of the sleeve body between the two knobs, wherein one of the two knobs is contiguous with one of the recesses at the second distal end of the sleeve body and the other of the two knobs is contiguous with the other of the recesses at the second distal end of the sleeve body, and wherein said creating the corner joint includes fitting the first corner fitting and the second corner fitting together at a predetermined angle with the corner cut portions contacting each other over an entirety of each corner cut portion.

3. The method of claim 1, wherein said welding is performed such that a capillary action is created by magnetism and the weld is sucked into the first corner fitting and the second corner fitting.

4. The method of claim 1, wherein the inner diameter of the first sleeve body slidably fits over the first pipe member, and wherein the recesses of the first and second distal ends of the first and second corner fittings are configured to fit over the vertical pipe member of the predetermined size such that an entirety of the edge of the sleeve body contacts the outer periphery of the vertical pipe member in a state in which a longitudinal axis of the vertical pipe member is perpendicular to a longitudinal axis of the first and second sleeve body and the vertical pipe member is nested in the recesses of the second distal ends.

5. The method of claim 1, wherein the first and second sleeve body have a circular cross section.

6. The method of claim 1, wherein the first and second sleeve body is made of carbon steel and the first and second pipe member is made of steel, and the inner diameter of the first and second sleeve body fits over the respective first and second pipe members of the predetermined size with a clearance of not more than 1/32nd of an inch.

7. The method of claim 1, wherein each of the first pipe member, the second pipe member, and the vertical pipe member are drill pipe.

8. The method of claim 1, wherein the first pipe member is a piece of used drill pipe.

9. The method of claim 1, further comprising:

providing a splice fitting including (i) a sleeve body having a hollow inner space and configured to coaxially fit over a pipe member of a predetermined size, (ii) wherein the sleeve body of the splice fitting has a first distal end and a second distal end spaced apart from the first distal end in a longitudinal direction, (iii) wherein an edge of the sleeve body of the splice fitting at the first distal end has two protruding tabs and two recesses, the protruding tabs protruding farther than the recesses in the longitudinal direction, the protruding tabs being diametrically opposed to each other in a radial direction of the sleeve body, and the recesses being diametrically opposed to each other in the radial direction of the sleeve body, such that the protruding tabs and the recesses are arranged alternately around a circumferential direction of the sleeve body, (iv) wherein the two protruding tabs and the two recesses of the first distal end of the sleeve body of the splice fitting are configured and arranged such that the first distal end of the sleeve body fits over the pipe member of the predetermined size with the sleeve body contacting an outer periphery of the pipe member at the protruding tabs and at the recesses in a state in which a longitudinal axis of the pipe member is perpendicular to a longitudinal axis of the sleeve body and the pipe member is nested in the recesses and between the two protruding tabs of the first distal end, (v) wherein an edge of the sleeve body of the splice fitting at the second distal end has two protruding tabs and two recesses, the protruding tabs protruding farther than the recesses in the longitudinal direction, the protruding tabs being diametrically opposed to each other in a radial direction of the sleeve body, and the recesses being diametrically opposed to each other in the radial direction of the sleeve body, such that the protruding tabs and the recesses are arranged alternately around a circumferential direction of the sleeve body, and (vi) wherein the two protruding tabs and the two recesses of the second distal end of the sleeve body of the splice fitting are configured and arranged such that the second distal end of the sleeve body fits over the pipe member of the predetermined size with the sleeve body contacting an outer periphery of the pipe member at the protruding tabs and at the recesses in a state in which a longitudinal axis of the pipe member is perpendicular to a longitudinal axis of the sleeve body and the pipe member is nested in the recesses and between the two protruding tabs of the second distal end;

providing a second pipe member;

providing a third pipe member; and creating a T-joint by welding the splice fitting on the second pipe member such that the longitudinal axis of the splice fitting is parallel to the longitudinal axis of the second pipe member and welding the third pipe member to the splice fitting with the longitudinal axis of the third pipe member being perpendicular to the longitudinal axis of the second pipe member and with the third pipe member being nested between the protruding tabs of one of the first distal end and the second distal end of the splice fitting.

10. The method of claim 9, wherein said welding is performed such that a capillary action is created by magnetism and the weld is sucked into the splice fitting between the splice fitting and the second pipe member.

11. The method of claim 1, further comprising:

providing a first splice fitting including (i) a sleeve body having a hollow inner space and configured to coaxially fit over a pipe member of a predetermined size, (ii) wherein the sleeve body of the splice fitting has a first distal end and a second distal end spaced apart from the first distal end in a longitudinal direction, (iii) wherein an edge of the sleeve body of the splice fitting at the first distal end has two protruding tabs and two recesses, the protruding tabs protruding farther than the recesses in the longitudinal direction, the protruding tabs being diametrically opposed to each other in a radial direction of the sleeve body, and the recesses being diametrically opposed to each other in the radial direction of the sleeve body, such that the protruding tabs and the recesses are arranged alternately around a circumferential direction of the sleeve body, (iv) wherein the two protruding tabs and the two recesses of the first distal end of the sleeve body of the splice fitting are configured and arranged such that the first distal end of the sleeve body fits over the pipe member of the predetermined size with the sleeve body contacting an outer periphery of the pipe member at the protruding tabs and at the recesses in a state in which a longitudinal axis of the pipe member is perpendicular to a longitudinal axis of the sleeve body and the pipe member is nested in the recesses and between the two protruding tabs of the first distal end, (v) wherein an edge of the sleeve body of the splice fitting at the second distal end has two protruding tabs and two recesses, the protruding tabs protruding farther than the recesses in the longitudinal direction, the protruding tabs being diametrically opposed to each other in a radial direction of the sleeve body, and the recesses being diametrically opposed to each other in the radial direction of the sleeve body, such that the protruding tabs and the recesses are arranged alternately around a circumferential direction of the sleeve body, and (vi) wherein the two protruding tabs and the two recesses of the second distal end of the sleeve body of the splice fitting are configured and arranged such that the second distal end of the sleeve body fits over the pipe member of the predetermined size with the sleeve body contacting an outer periphery of the pipe member at the protruding tabs and at the recesses in a state in which a longitudinal axis of the pipe member is perpendicular to a longitudinal axis of the sleeve body and the pipe member is nested in the recesses and between the two protruding tabs of the second distal end;

providing a second splice fitting identical or substantially identical to the first splice fitting;

providing a second pipe member;

providing a third pipe member;

providing a fourth pipe member; and creating an H-joint by welding the first splice fitting and the second splice fitting on the second pipe member such that the longitudinal axes of the first and second splice fittings are parallel to the longitudinal axis of the second pipe member, welding the third pipe member to the first splice fitting with the longitudinal axis of the third pipe member being perpendicular to the longitudinal axis of the second pipe member and the third pipe member being nested between the protruding tabs of the first distal end of the first splice fitting, and welding the fourth pipe member to the second splice fitting with the longitudinal axis of the fourth pipe member being perpendicular to the longitudinal axis of the second pipe member and the fourth pipe member being nested between the protruding tabs of the first distal end of the second splice fitting.

12. The method of claim 1, further comprising:

providing a third corner fitting identical or substantially identical to the first corner fitting;

providing a second pipe member;

providing a third pipe member; and creating a T-joint by welding the third corner fitting on the second pipe member such that the longitudinal axis of the third corner fitting is parallel to the longitudinal axis of the second pipe member and welding the third pipe member to the third corner fitting with the longitudinal axis of the third pipe member being perpendicular to the longitudinal axis of the second pipe member and with the third pipe member being nested between the protruding tabs of the first distal end of the third corner fitting.

13. The method of claim 1, further comprising:

providing a third corner fitting identical or substantially identical to the first corner fitting;

providing a fourth corner fitting identical or substantially identical to the first corner fitting;

providing a second pipe member;

providing a third pipe member;

providing a fourth pipe member; and creating an H-joint by welding the third corner fitting and the fourth corner fitting on the second pipe member such that the longitudinal axes of the third and fourth corner fittings are parallel to the longitudinal axis of the second pipe member, welding the third pipe member to the third corner fitting with the longitudinal axis of the third pipe member being perpendicular to the longitudinal axis of the second pipe member and the third pipe member being nested between the protruding tabs of the first distal end of the third corner fitting, and welding the fourth pipe member to the fourth corner fitting with the longitudinal axis of the fourth pipe member being perpendicular to the longitudinal axis of the second pipe member and the fourth pipe member being nested between the protruding tabs of the first distal end of the fourth corner fitting.

* * * * *